US011415248B2

(12) United States Patent
Berbiano et al.

(10) Patent No.: US 11,415,248 B2
(45) Date of Patent: Aug. 16, 2022

(54) SYSTEM AND METHOD FOR CONNECTING A FIRST AND SECOND HOSE COUPLING, AND A LOCKING DEVICE

(71) Applicant: Prysmian Cabos E Sistemas Do Brasil S.A., São Paulo (BR)

(72) Inventors: Silmerio Pereira Berbiano, São Paulo (BR); Wagner Gomes De Jesus, São Paulo (BR)

(73) Assignee: PRYSMIAN CABOS E SISTEMAS DO BRASIL S.A., São Paulo (BR)

( * ) Notice: Subject to any disclaimer, the term of this patent is extended or adjusted under 35 U.S.C. 154(b) by 611 days.

(21) Appl. No.: 16/250,220

(22) Filed: Jan. 17, 2019

(65) Prior Publication Data

US 2019/0219200 A1 Jul. 18, 2019

(30) Foreign Application Priority Data

Jan. 17, 2018 (BR) .......................... 1020180010069

(51) Int. Cl.
*F16L 19/00* (2006.01)
*F16L 37/12* (2006.01)
*F16L 19/025* (2006.01)

(52) U.S. Cl.
CPC .......... *F16L 19/005* (2013.01); *F16L 19/025* (2013.01); *F16L 37/1225* (2013.01)

(58) Field of Classification Search
CPC .... F16L 19/005; F16L 19/025; F16L 37/1225
USPC ......................................................... 285/92
See application file for complete search history.

(56) References Cited

U.S. PATENT DOCUMENTS

| 1,752,193 | A | * | 3/1930 | O'Hanlon | F16L 3/003 |
| | | | | | 239/588 |
| 3,565,465 | A | * | 2/1971 | Wemyss | F16L 37/1225 |
| | | | | | 285/81 |
| 5,350,201 | A | | 9/1994 | Bynum | |
| 8,205,804 | B2 | * | 6/2012 | Parker | F16L 55/005 |
| | | | | | 239/1 |
| 9,534,718 | B2 | * | 1/2017 | O'Neil | F16L 21/065 |

(Continued)

FOREIGN PATENT DOCUMENTS

| CN | 205859403 U | | 1/2017 | |
| GB | 191024160 A | * | 12/1910 | .............. F16L 37/52 |

(Continued)

*Primary Examiner* — Matthew Troutman
*Assistant Examiner* — Fannie C Kee
(74) *Attorney, Agent, or Firm* — Slater Matsil, LLP

(57) ABSTRACT

A system includes first and second hose couplings, each having a hose body, an enlarged section integrated with the hose body, and a connecting section that is mobile in relation to the hose body. An intermediate connector includes a central section, a first lateral section and a second lateral section. The first lateral section can fit into the first connecting section and the second lateral section can fit into the second connecting section. A locking device includes a body having a first locking section, a second locking section and a central locking section. The first locking section couples with the enlarged section of the first hose coupling, the second locking section couples with the enlarged section of the second hose coupling, and the central locking section couples with the central section of the connector.

15 Claims, 4 Drawing Sheets

(56) References Cited

U.S. PATENT DOCUMENTS

2002/0071718 A1\* 6/2002 Marty ................. F16L 37/1225
                                                                                     403/293
2013/0328306 A1\* 12/2013 Sato ...................... F16L 19/065
                                                                                     285/386
2015/0354617 A1\* 12/2015 Lambert ................. F16B 2/065
                                                                                 24/483

FOREIGN PATENT DOCUMENTS

| GB | 416523 A | 9/1934 |
|----|----------|--------|
| GB | 624386 A | 6/1949 |
| GB | 1232938 A | 5/1971 |
| GB | 2514556 A | 12/2014 |

\* cited by examiner

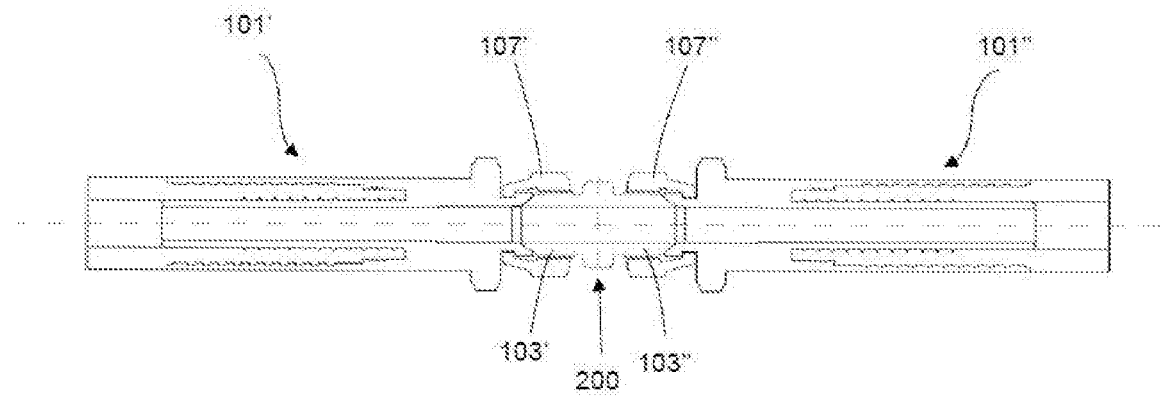
FIG. 1  PRIOR ART
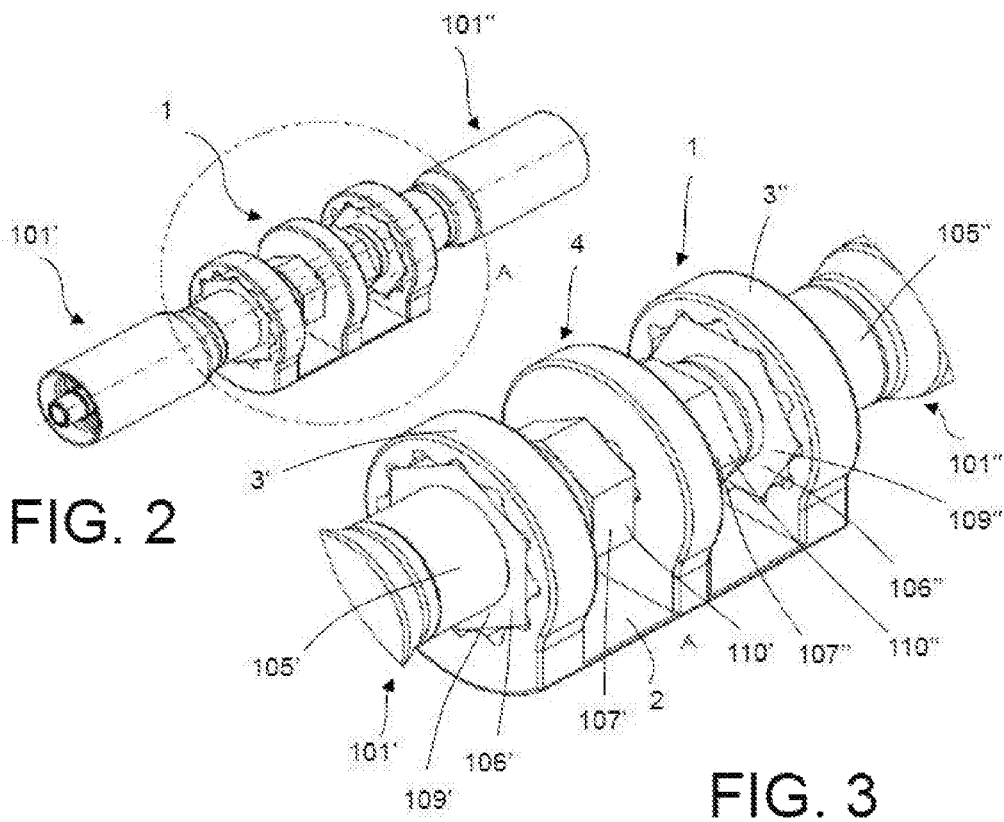
FIG. 2
FIG. 3

SYSTEM AND METHOD FOR CONNECTING A FIRST AND SECOND HOSE COUPLING, AND A LOCKING DEVICE

CROSS-REFERENCE TO RELATED APPLICATIONS

This application claims priority to Brazilian Application No. 10 2018 001006 9, filed on Jan. 17, 2018, which application is hereby incorporated herein by reference.

TECHNICAL FIELD

This invention concerns a system and method for connecting a first and second hose coupling and a locking device.

BACKGROUND

With reference to FIG. 1, in the field of oil & gas, hydraulic hoses comprise hose couplings 101',101" with respective revolving sections 107', 107" to be screwed into the respective lateral threaded sections 103', 103" of a connector 200. Following pressurization, the hydraulic hoses may tend to twist. Thus, the energy accumulated throughout the hoses may be exerted on the hose couplings 101', 101" and rotations in relation to the hose couplings can occur, potentially resulting in the unscrewing of the revolving nuts 107', 107" of the threaded sections 103', 103" of the connector 200. As a result, fluid can leak and/or the hoses can become disconnected at the hose coupling.

In order to resolve the aforementioned problem, several solutions have been proposed, where a locking device is included in the hose couplings.

For example, British patent document GB 416.523 A describes a double-ended coupling with a central part containing a hexagonal section and externally threaded sections and conical sections to connect pipes. Nuts with conical holes are mounted on the threaded sections by screwing. Between the hole and the nut there is a section with a hexagonal external shape. A hexagonal casing with a rear anchoring part connects the hexagonal sections of the central part and the threads of the coupling. When in position, the rear part can be turned downwards or interlocked with the pipe to prevent the three hexagons from moving together.

Chinese patent document CN 205859403 U refers to the connection of two hose couplings with their respective revolving nuts through an intermediary articulated joint. An anti-rotation hose rotationally locks the revolving nipple and the hose coupling threads. The anti-rotation hose is locked axially by a pin.

U.S. Pat. No. 5,350,201A refers to a capture device comprising a pair of serrated clips fully connected by a bar. A first clip is radially dimensioned to fit to the hexagonal exterior of a first section of pipe and a second clip is radially dimensioned to fit to the hexagonal exterior of a nut.

SUMMARY

Embodiments of this invention concern a system for connecting hose couplings, particularly for interlocking oil and gas pipes. Embodiments of this invention also concern a system and method for connecting hoses of the aforementioned type.

The applicant observed that in systems with a locking device in accordance with the known technique, once the hoses are connected and locked it is no longer possible to access the connection. Specifically it is no longer possible to access the threading of nuts unless the coupling is partially dismantled. So, for example, if a fluid leak is observed due to inadequate screwing of the nuts (for example, with inadequate torque) or because the nuts are partially stripped due to use, it is impossible to fix it unless the locking device (namely, the hexagonal casing of GB 416.523 A, the anti-rotation hose of CN 205859403 U, and the capturing device of U.S. Pat. No. 5,350,201A) is removed.

Embodiments of the invention provide a system for locking the fitting connections of a hose where the hose couplings are mutually, fully locked, which is easy to assemble/dismantle, and which does not require complete dismantling to restore the appropriate conditions of connection, such as rethreading the revolving nuts of the hose coupling.

The applicant verified that a system comprising a locking device which interlocked hose coupling nipples instead of hose coupling revolving nuts could be easily assembled and dismantled preventing damage to the seal of the seat, thus increasing the efficiency of the seal. At the same time, this device makes it possible to access the revolving nuts without needing to remove the locking device, thus keeping the hose couplings interlocked through the locking device.

Firstly, embodiments refer to a system for connecting a first and second hose coupling, as follows. The first and second hose couplings each comprise a respective first and second hose body, respectively having first and second enlarged sections integrated with the body of each hose, and a first and second mobile connecting section in relation to the body of each hose. An intermediate connector comprises a central section, and a first and second lateral section each fitting, respectively, into the first and second connecting sections. A locking device with a body, having a first and second locking section, connects, respectively, the first and second enlarged hose coupling sections, and a central locking section coupling with the central section of the connector.

In one modality, the hose couplings are for oil or gas hoses, specifically hoses resistant to high compression (HRC).

In one modality of the system described, the first and second enlarged sections of each hose coupling comprise a first and second revolving nipple. In one modality, the first and second revolving nipples have an external profile in polygonal format.

In one modality, the first and second revolving nipples are coupled to the first and second hose bodies such that they freely rotate axially in relation to them.

In one modality of the system described, the first and second lateral connector sections comprise a first and second lateral threaded section, and a first and second revolving nut have internal radially threaded sections appropriate for screwing in the first and second threaded sections of the lateral connector sections.

In one modality of the system hereby described, the first, second and central locking sections of the locking device comprise respective annular bodies having internal apertures designed in their format to connect the enlarged sections of the hose coupling and the central section of the connector, respectively.

In one modality of the system hereby described, the first, second and central sections of the locking device are spaced out from each other and create a first space between the first and central locking sections, and a second space between the second and central locking sections.

In one modality of the system hereby described, the body of the locking device comprises a support plate supporting the first, second and central locking portions, projecting therefrom from the same side.

In a second section, the present description refers to a device for locking hose couplings, which device comprises a body with a first and section locking section configured to connect, respectively, the enlarged sections of a first and second hose coupling, and a central locking section configured to connect to a central section of the connector.

BRIEF DESCRIPTION OF THE DRAWINGS

Additional characteristics and advantages will become clearer from the following description of some modalities presented by way of example with reference to the annexed drawings where:

FIG. 1 shows a schematic longitudinal sectional view of a known hose fitting;

FIG. 2 shows a perspective view of a system for connecting hoses in accordance with one modality of the description;

FIG. 3 shows a detail from the system in FIG. 2;

DETAILED DESCRIPTION OF ILLUSTRATIVE EMBODIMENTS

In the following description, the same alphanumeric references are used for analogous exemplary elements where they are represented in different drawings.

Figure 4:
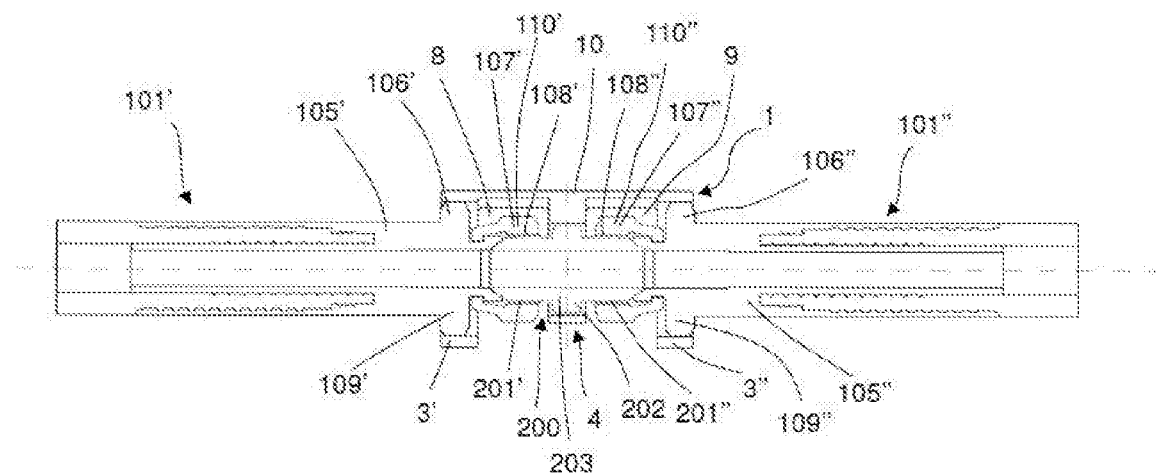
FIG. 4 shows a schematic longitudinal sectional view of the system in FIG. 2.

FIGS. 2-4 show one modality of a system for connecting a first 101' and a second 101" hose coupling in accordance with the present description in an assembled condition. Each hose coupling 101',101" comprises the respective first 105' and second 105" hose bodies, respectively having a first 106' and a second 106" expanded section integrated with the first 105' and second 105" hose body, and a mobile connecting section 107', 107" in relation to the respective first 105' and second 105" hose bodies, being specifically mobile to lock the respect hose fitting into an intermediate connector 200.

In one modality, the first 106' and second 106" expanded sections are fully formed with the first 105' and second 105" hose bodies, and, in accordance with one modality, they comprise a first 109' and a second 109" revolving nipple which may have polygonal external profiles, such as hexagonal ones. In one modality, the connecting sections 107', 107" comprise a first 110' and a second 110" revolving connecting nut coupled to the first 105' and second 105" hose bodies in order to be able to freely axially rotate in relation to them. The revolving fixing nuts 110', 110" may comprise threaded sections 108',108", for example, in a radially internal position, suitable for being screwed into the corresponding lateral threaded sections 201', 201" of the connector 200, just as the hose sections 101',101" can be coupled to the connector 200. The connector 200, in turn, comprises a central section 202 located, for example, between the lateral threaded sections 201', 201".

The central sections 202 can be formed into one piece with a connector 200 and may comprise a revolving nipple 203 with a polygonal external profile, such as hexagonal one. In accordance with one possible modality, the central section of the connector 202 is smaller in size than the enlarged hose coupling sections 106', 106". Specifically, the radial dimensions of the central section of the connector 202 are smaller than the radial dimensions of the enlarged sections of the hose coupling 106', 106". In one modality, the radial dimensions of the enlarged sections of the hose coupling 106', 106" are equal.

In one modality, the hose couplings 101',101" and the connector 200 are tubular, such that, once connected, they form a single duct for the fluid.

The system also comprises a device 1 for locking the hose couplings 101', 101" and the connector 200 once they are coupled (FIGS. 2-4 and 5), specifically configured to prevent rotations between them following their connection, as shall be discussed below.

Figure 5:
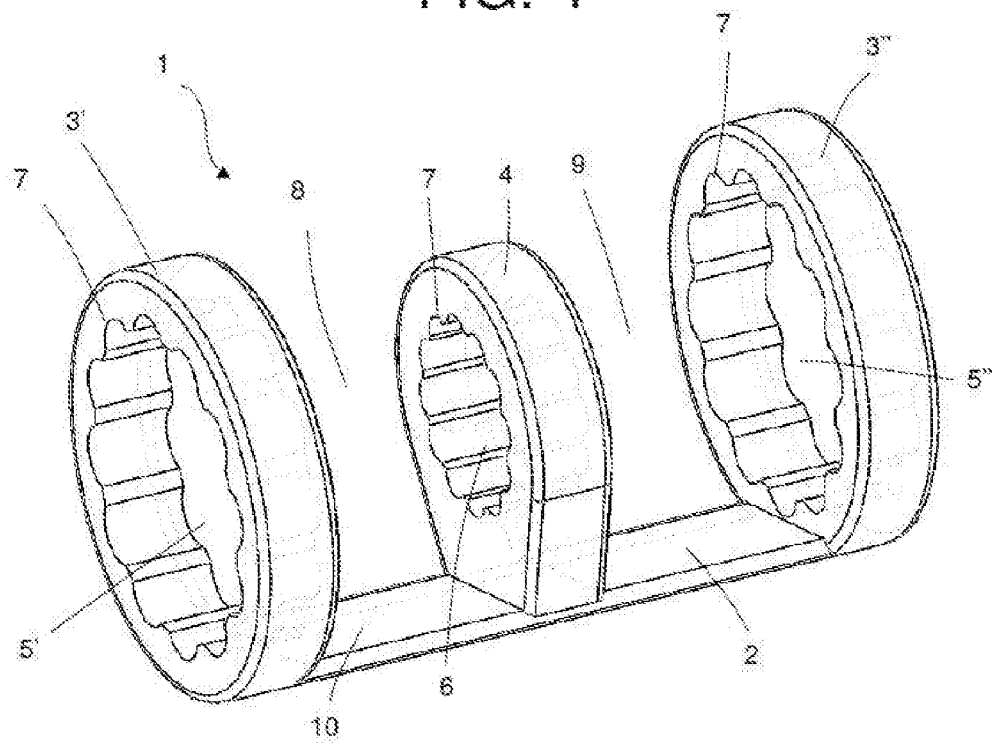
FIG. 5 shows a perspective view of a locking device in accordance with one modality of the description.

With specific reference to FIG. 5, the locking device 1 comprises a body 2 with a first 3', a second 3" and a central 4 locking section, which can all be fully formed with the body 2. In one modality, the central locking section 4 is positioned between the first 3' and second 3" locking sections. The first locking section 3' is suitable for coupling to the first enlarged section 106' of the first hose coupling 101'; the second locking section 3" is suitable for coupling to the second enlarged section 106" of the second hose coupling 101," and the central locking section 4 is suitable for being coupled to the central section 202 of the connector 200, such that, after said couplings with the locking sections 3', 3", 4 of the locking device 1, the enlarged section 106' of the first hose coupling 101', the enlarged section 106" of the second hose coupling 101" and the central section 202 of the connector 200 are rotationally integrated with the locking device 1, and consequently become rotationally integrated with one another.

In one modality, the locking portions 3', 3, 4 are configured to form couplings, in format, with the enlarged section 106' of the first hose coupling 101', the enlarged section 106" of the second hose coupling 101" and the central section 202 of the connector 200, respectively. In accordance with one modality, the locking sections 3', 3, 4 comprise respective annular bodies with internal apertures 5', 5", 6 (whose edges can be closed) where the enlarged section 106' of the first hose coupling 101' in polygonal form, specifically hexagonal form, the enlarged section 106" of the second hose coupling 101" and the central section 202 of the connector 200, can be inserted in a sliding manner and, following insertion, are rotationally locked due to the format coupling.

For example, the apertures 5', 5", 6 can have profiles which are complementary with the revolving nipple 109' of the first hose coupling 101', with the revolving nipple 109" of the second hose coupling 101" and with the external profiles of the revolving nipple 203 of the connector 200. In accordance with one modality, as shown in the Figures, the apertures 5', 5", 6 are circumferential in form and comprise a number of sections 7 which curve radially outwards, optionally arranged circumferentially along the edge of the apertures 5', 5", 6. In accordance with one possible modality, there are twelve sections 7 and each of them can accommodate one corner of the hexagonal edge of the revolving nipple 109' of the first hose coupling 101', the revolving nipple 109" of the second hose coupling 101" and the revolving nipple 203 of the connector 200, respectively, which thus can be accommodated within the respective apertures 5', 5", 6 in twelve different angular positions being rotationally locked following insertion.

In one modality, the locking sections 3', 3, 4 are spaced out from each other and create a first space 8 between the first 3', and central 4 locking sections, and a second space 9 between the central 4 and second 3" locking sections. The first 8 and second 9 spaces are accessible from outside the device 1, for example, by using a tool. In addition to this, the longitudinal distance between the first 3' and central 4 locking sections, and between the central 4 and second 3" locking sections are such that the first connection section 107' of the first hose coupling 101' (specifically the first revolving connecting nut no') can be positioned in the first space 8 and the second connecting section 107" of the second hose coupling 101" (specifically the second revolving connecting nut 110") can be positioned in the second space 9. In this way, it is possible to access the first connecting section 107' of the first hose coupling 101' and the second connecting section 107" of the second hose coupling 101", for example, using the aforementioned tool, after the first hose coupling 101', the second hose coupling 101" and the connector 200 are interlocked by the locking device 1.

In one modality, the body 2 of the locking device 1 comprises a support plate 10 supporting the locking sections 3', 3, 4, which project transversally from the latter. The first 3' and second 3" locking sections are positioned on two opposite sides of the support plate 10 and the central locking section 4 is in an intermediate position between the first 3' and second 3" locking sections.

With reference to FIGS. 6a-6d, one possible method of arranging the system in accordance with one modality of the description will be described.

Figure 6A:
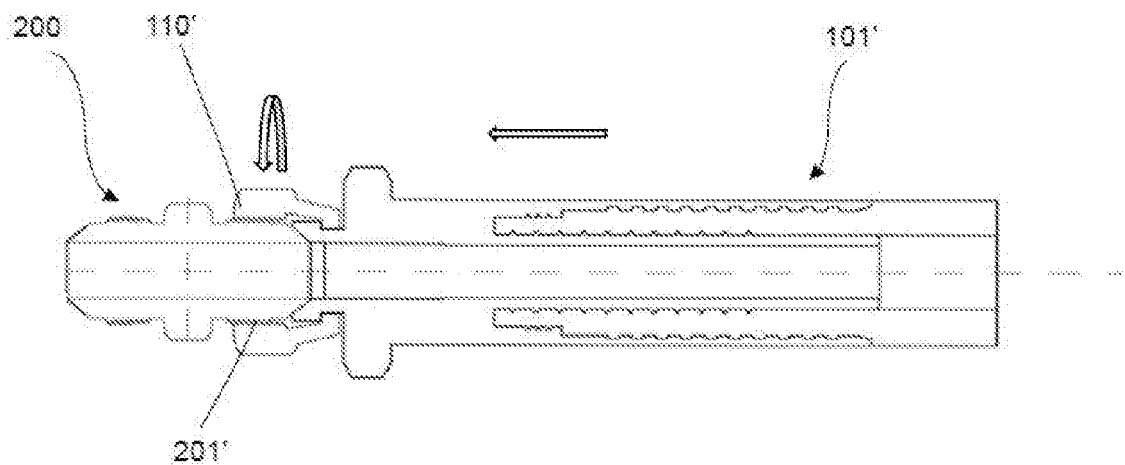
FIGS. 6a-6d show an example of assembly sequences for a system in accordance with the description.
Figure 6B:
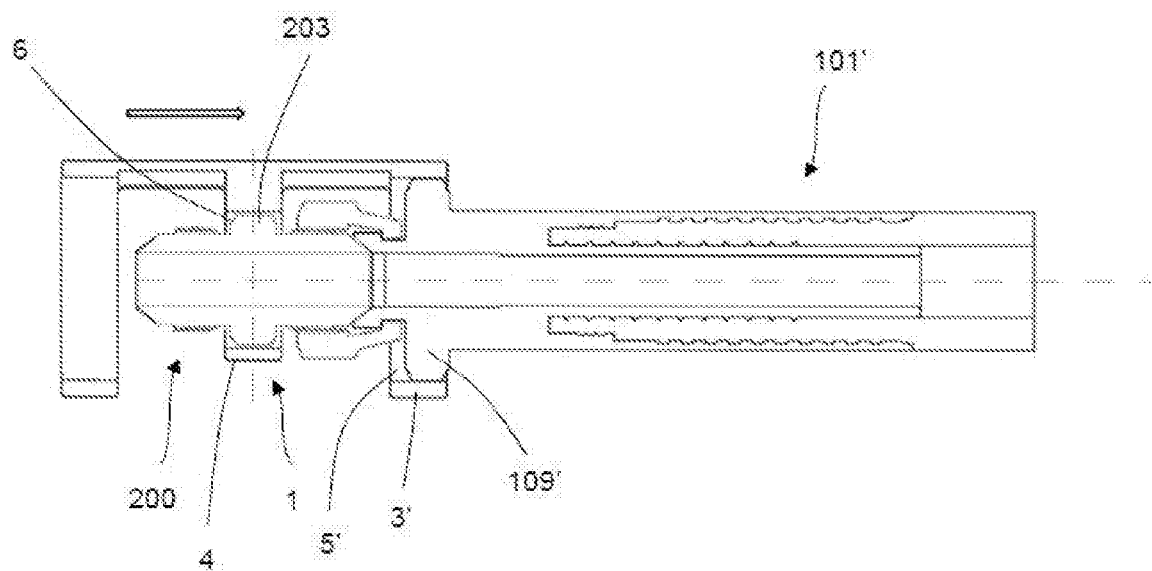
Figure 6C:
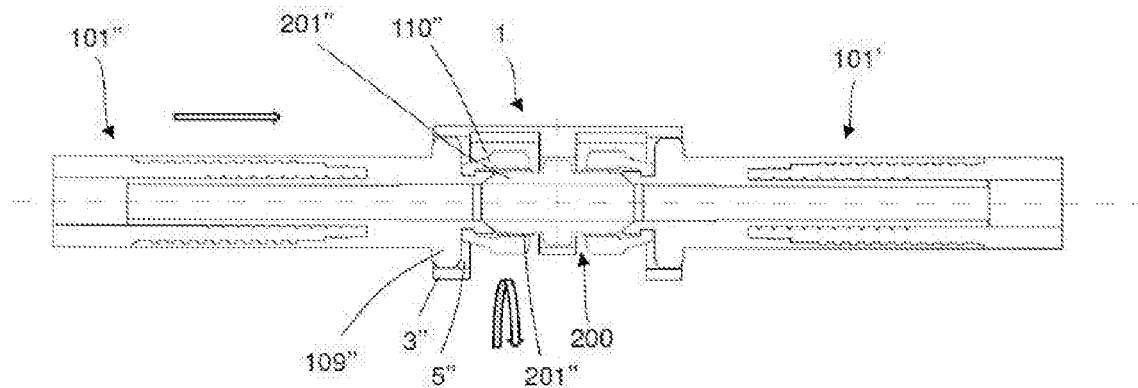
Figure 6D:
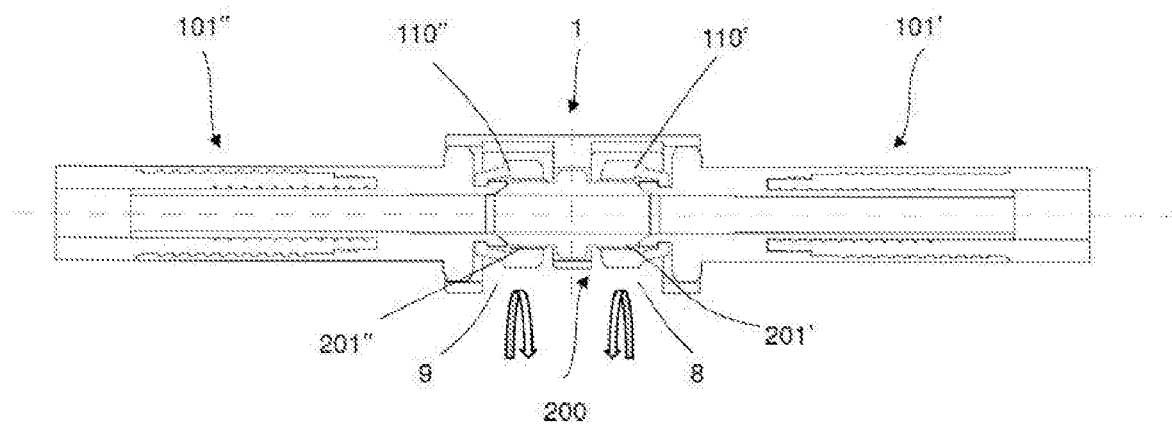

The method may comprise:

providing the first hose coupling 101', the second hose coupling 101", the connector 200 and the locking device 1;

at least partially screwing the revolving nut 110' of the first hose coupling 101' onto the first lateral threaded section 201' of the connector 200 (FIG. 6a). It should be noted that this stage may be realized roughly, which is to say, it is not necessary to apply the corrective torque to couple the revolving nut 110' to the connector 200;

coupling the first hose coupling 101' of the connector 200 with the locking device 1 inserting the revolving nipple 109' of the first hose coupling 101' into the aperture 5' of the first locking section 3' of the locking device 1 and the central revolving nipple 203 of the connector 200 within the aperture 6 of the central locking portion 4 of the locking device 1 (FIG. 6b);

inserting the revolving nipple 109" of the second hose coupling 101" into the aperture 5" of the second locking section 3" of the locking device 1 and at least partially screwing the revolving nut 110" of the second hose coupling 101" into the second lateral threaded section 201" of the connector 200 (FIG. 6c);

fixing, for example, screwing and/or in accordance with the predetermined torque, the revolving nut 110' of the first hose coupling 101' into the first lateral threaded section 201' of the connector 200 and fixing, for example, screwing and/or in accordance with the predetermined torque, the revolving nut 110' of the second hose coupling into the second lateral threaded section 201" of the connector 200 (FIG. 6d).

The aforementioned screwing can be achieved by inserting a tool, for example, two tools optionally and simultaneously, into the spaces 8 and 9 of the locking device 1.

What is claimed is:
1. A system comprising:
   a first hose coupling comprising a first hose body, a first enlarged section integrated with the first hose body, and a first connecting section that is mobile in relation to the first hose body;
   a second hose coupling comprising a second hose body, a second enlarged section integrated with the second hose body, and a second connecting section that is mobile in relation to the second hose body;
   an intermediate connector comprising a central section, a first lateral section and a second lateral section, the first lateral section fitting into the first connecting section and the second lateral section fitting into the second connecting section; and
   a locking device with a body having a first locking section, a second locking section and a central locking section, the first locking section coupling with the first enlarged section of the first hose coupling, the second locking section coupling with the second enlarged section of the second hose coupling, and the central locking section coupling with the central section of the connector.

2. The system of claim 1, wherein the first locking section of the locking device comprises a first annular body having an internal aperture designed to couple with the enlarged section of the first hose coupling, wherein the second locking section of the locking device comprises a second annular body having an internal aperture designed to couple with the enlarged section of the second hose coupling, and wherein the central locking section of the locking device comprises a central annular body having an internal aperture designed to couple with the central section of the connector.

3. The system of claim 1, wherein the first, second and central locking sections of the locking device are spaced out from each other and create a first space between the first locking section and the central locking section, and a second space between the second locking section and central locking section.

4. A system comprising:
   a first hose coupling comprising a first hose body, a first enlarged section integrated with the first hose body, and a first connecting section that is mobile in relation to the first hose body;
   a second hose coupling comprising a second hose body, a second enlarged section integrated with the second hose body, and a second connecting section that is mobile in relation to the second hose body;
   an intermediate connector comprising a central section, a first lateral section and a second lateral section, the first lateral section fitting into the first connecting section and the second lateral section fitting into the second connecting section; and
   a locking device with a body having a first locking section, a second locking section and a central locking section, the first locking section coupling with the first enlarged section of the first hose coupling, the second locking section coupling with the second enlarged section of the second hose coupling, and the central locking section coupling with the central section of the connector, wherein the first enlarged section comprises a first revolving section and the second enlarged section comprises a second revolving section.

5. The system of claim 4, wherein the first enlarged section comprises a first revolving nipple and the second enlarged section comprises a second revolving nipple.

6. The system of claim 4, wherein the first and second lateral sections of the connector comprise first and second lateral threaded sections and wherein the first and second revolving sections have internal radially threaded sections suitable for being screwed into the first and second lateral threaded sections.

7. The system of claim 4, wherein the first locking section of the locking device comprises a first annular body having an internal aperture designed to couple with the enlarged section of the first hose coupling, wherein the second locking section of the locking device comprises a second annular body having an internal aperture designed to couple with the enlarged section of the second hose coupling, and wherein the central locking section of the locking device comprises a central annular body having an internal aperture designed to couple with the central section of the connector.

8. The system of claim 4, wherein the first, second and central locking sections of the locking device are spaced out from each other and create a first space between the first locking section and the central locking section, and a second space between the second locking section and central locking section.

9. A system comprising:
- a first hose coupling comprising a first hose body, a first enlarged section integrated with the first hose body, and a first connecting section that is mobile in relation to the first hose body;
- a second hose coupling comprising a second hose body, a second enlarged section integrated with the second hose body, and a second connecting section that is mobile in relation to the second hose body;
- an intermediate connector comprising a central section, a first lateral section and a second lateral section, the first lateral section fitting into the first connecting section and the second lateral section fitting into the second connecting section; and
- a locking device with a body having a first locking section, a second locking section and a central locking section, the first locking section coupling with the first enlarged section of the first hose coupling, the second locking section coupling with the second enlarged section of the second hose coupling, and the central locking section coupling with the central section of the connector, wherein the body of the locking device comprises a support plate that supports the first, second and central locking sections.

10. The system of claim 9, wherein the first, second and central locking sections project from the same side of the support plate.

11. The system of claim 9, wherein the first enlarged section comprises a first revolving section and the second enlarged section comprises a second revolving section.

12. The system of claim 11, wherein the first enlarged section comprises a first revolving nipple and the second enlarged section comprises a second revolving nipple.

13. The system of claim 11, wherein the first and second lateral sections of the connector comprise first and second lateral threaded sections and wherein the first and second revolving sections have internal radially threaded sections suitable for being screwed into the first and second lateral threaded sections.

14. The system of claim 9, wherein the first locking section of the locking device comprises a first annular body having an internal aperture designed to couple with the enlarged section of the first hose coupling, wherein the second locking section of the locking device comprises a second annular body having an internal aperture designed to couple with the enlarged section of the second hose coupling, and wherein the central locking section of the locking device comprises a central annular body having an internal aperture designed to couple with the central section of the connector.

15. The system of claim 9, wherein the first, second and central locking sections of the locking device are spaced out from each other and create a first space between the first locking section and the central locking section, and a second space between the second locking section and central locking section.

* * * * *